United States Patent [19]
Iwasaki

[11] 4,398,419
[45] Aug. 16, 1983

[54] ROTATIONAL ANGLE SENSOR

[75] Inventor: Shinichiro Iwasaki, Auburn Heights, Mich.

[73] Assignee: Aisin Seiki Company, Limited, Aichi, Japan

[21] Appl. No.: 371,971

[22] Filed: Apr. 26, 1982

Related U.S. Application Data

[63] Continuation of Ser. No. 182,663, Aug. 29, 1980, abandoned.

[51] Int. Cl.³ .............................................. G01B 7/30
[52] U.S. Cl. ...................................... 73/518; 336/110
[58] Field of Search ..................... 336/30, 110; 73/518; 324/207, 208

[56] References Cited

U.S. PATENT DOCUMENTS 3,877,314  4/1975  Bernin ............................. 73/517 B
4,140,971  2/1979  Blincoe ............................ 324/208

FOREIGN PATENT DOCUMENTS 909023  10/1962  United Kingdom ................ 324/207

OTHER PUBLICATIONS

"Force and Displacement Transducers . . ." by Mohri et al. from Electrical Engineering in Japan, vol. 99, No. 2, pp. 105-112, Feb. 1979.

*Primary Examiner*—James J. Gill
*Attorney, Agent, or Firm*—Oblon, Fisher, Spivak, McClelland & Maier

[57] ABSTRACT

A rotational angle sensor arrangement includes a casing, a rotary center shaft rotatably supported by the casing, a permanent magnetic secured to the casing, and at least one magnetically soft member carrying an electrical winding thereon firmly disposed in the casing. A ferromagnetic member is attached to the rotary shaft, and is capable of angular displacement above the upper ends of the permanent magnet and the magnetically soft member without making contact with the same. The angular displacement of the ferromagnetic material member causes corresponding changes in the magnetic flux provided by the permanent magnet acting on the magnetically soft member which are detected. The magnetically soft member is preferably formed from an amorphous magnetic material. Various embodiments of the rotational angle sensor device are disclosed.

12 Claims, 19 Drawing Figures

FIG_1

FIG_7

FIG_11a

FIG_11b

ROTATIONAL ANGLE SENSOR

This is a continuation of application Ser. No. 182,663, filed Aug. 29, 1980 now abandoned.

BACKGROUND OF THE INVENTION

1. Field of the Invention

The present invention relates in general to a novel rotational angle sensor which converts rotational angles to corresponding electrical signals.

2. Description of the Prior Art

One prior art rotational angle sensor of the type disclosed herein is arranged to include at least one movable body capable of angular displacement on a rotary axis and a potentiometer having a slider linked to the movable body. In this sensor arrangement, the potentiometer provides an analog voltage output according to the amount of angular displacement of the movable body. In this type of sensor, the potentiometer should desirably have a thin-film resistor which has high wear resistance, and should also provide a stable voltage level output in response to the positions to be assumed by the slider. It is further desirable that the linkage connecting the movable body with the slider should be capable of being operated with reliable stability without causing loose connections. An additional requirement of the sensor is that the contact between the slider and the thin-film resistor should desirably take place with sufficient stability to permit the two contacting parts to resist any vibrations and shocks.

In the prior art sensor, however, the contact between the slider and the thin-film resistor in the potentiometer is implemented by pressure, such that as any one or both of the two contacting elements wear with time and when vibrations or shocks occur, the potentiometer eventually provides incorrect or improper output voltages is response to changes in the angular position of the movable body.

SUMMARY OF THE INVENTION

In light of the problems of the prior art sensor discussed above, it is, accordingly, one object of the present invention to provide an improved rotational angle sensor which includes a contact-less converter means thereby eliminating the need for a mechanical contact means in the mechanical-electrical transducer system for converting mechanical changes to corresponding electrical signals.

Another object of the present invention is to provide an improved rotational angle sensor or strong construction which makes it resistant to vibrations and shocks.

Still another object of the present invention is to provide an improved rotational angle sensor which permits relatively simple electrical processing of the detected rotational signals.

A further object of the present invention is to provide an improved rotational angle sensor which incorporates a large scale integrated (LSI) circuit of the type utilized in recently developed microcomputers, which contains relatively simple programmed logic which can interpret and process the detected rotational angle data.

In accordance with the present invention briefly summarized above, the rotational angle sensor arrangement includes a movable body made of synthetic resin material, a rotary shaft member rotatably supported inside the movable body, at least one magnetically soft member having an electrical coil thereon, and a permanent magnet spaced opposite to the magnetically soft member. The rotary shaft member carries a ferromagnetic material member, secured thereto, which is capable of angular displacement together with the movable body without making contact with the permanent magnet and the magnetically soft member. The ferromagnetic member controls the magnetic flux supplied by the permanent magnet which acts on the magnetically soft member.

In one preferred embodiment of the present invention, two magnetically soft members are spaced diametrically opposite to each other and in radial directions with respect to the central rotary shaft member. One permanent magnet is disposed on the circumference formed by the two magnetically soft members and is located at the middle position between the two members.

In another preferred embodiment, one permanent magnet and one magnetically soft member are arranged in a spaced relationship to each other on the circumference formed thereby. The magnetically soft member has a small transverse cross-section which enables it to reach its magnetic saturation readily. The electrical coil has a large number of turns which is sufficient to cause the magnetically soft member to be magnetically saturated when a relatively low level voltage is applied to the coil; therefore, a low level energizing current flows into the coil. The dimensions of the permanent magnet are reduced such that it can supply a magnetic field of sufficient strength depending on the amount of displacement of the ferromagnetic member within its predetermined range of movement.

A time interval T from the instant at which a voltage begins to be applied to the coil wound on the magnetically soft member to the instant at which the magnetically soft member reaches its magnetic saturation can be expressed in the following approximate equation:

$$T = \frac{N}{E} \times (\phi m - \phi x) \quad (1)$$

where:
E = applied voltage across the coil
N = number of turns of coil
$\phi m$ = maximum flux ($\neq$ saturated flux)
$\phi x$ = external magnetic field flux.

As can be readily understood from the above equation, moving the ferromagnetic member causes $\phi x$ to change, thus changing the tme interval T. In more detail, moving the ferromagnetic member according to the angular displacement of the movable body causes the corresponding changes in the external magnetic flux $\phi x$ to be applied to the magnetically soft member, thus causing corresponding changes in the time interval T from the instant at which a voltage is applied to the coil to the instant at which the coil energizing current reaches a given level. Based upon the above observation, the rotational angle sensor according to the present invention includes an electrical circuit or electronic semiconductor device which detects the time interval T and which provides an electrical signal output representing a voltage level or digital code corresponding to the detected time interval T.

In the preferred embodiments of the present invention, an amorphous magnetic material is preferably employed to form a magnetically soft member. Usually, since the amorphous magnetic material member must be manufactured by quenching from a liquid-state metal, it is formed in thin sheets. In terms of its magnetic properties, it is ferromagnetic and has high permeability ($U_{max} > 10^3$) and high magnetic saturation. Additionally, it provides a low coercive force ($< 1.0\ 0_E$), and is mechanically strong and hard to break. Other features are its resilience and reproducibility. Those features or properties of the amorphous magnetic material meet the mechanical and electrical requirements of the rotational angle sensor according to the present invention. Therefore, utilizing such material makes it easy to electrically process signals and provides an improved accuracy in determining the value of the time interval T. It also permits a relatively simple manufacturing process and makes the magnetically soft member more resistant to physical vibrations and shock. Such magnetically soft materials are described in Hasegawa et al, "Soft Magnetic Properties of Metallic Glasses - Recent Developments", J. Appl. Phys. 50(3), March, 1979, pp. 1551-1556. Magnetically soft materials are sold under the trademark METGLAS (TM) by Allied Chemical Corp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6a is a graphic representation of the variation of the output voltage as a function of angular displacement of the ferromagnetic member obtained by using the arrangement shown in FIGS. 5a and 5b coupled to the electrical processing circuit shown in FIG. 4a;

FIG. 10b shows the waveforms of the input and output signals of the electrical processing circuit 100 shown in FIG. 10a;

FIG. 11b shows waveforms of the input and output signals of the electrical processing circuit 120 shown in FIG. 11a;

DESCRIPTION OF THE PREFERRED EMBODIMENTS

Figure 1:
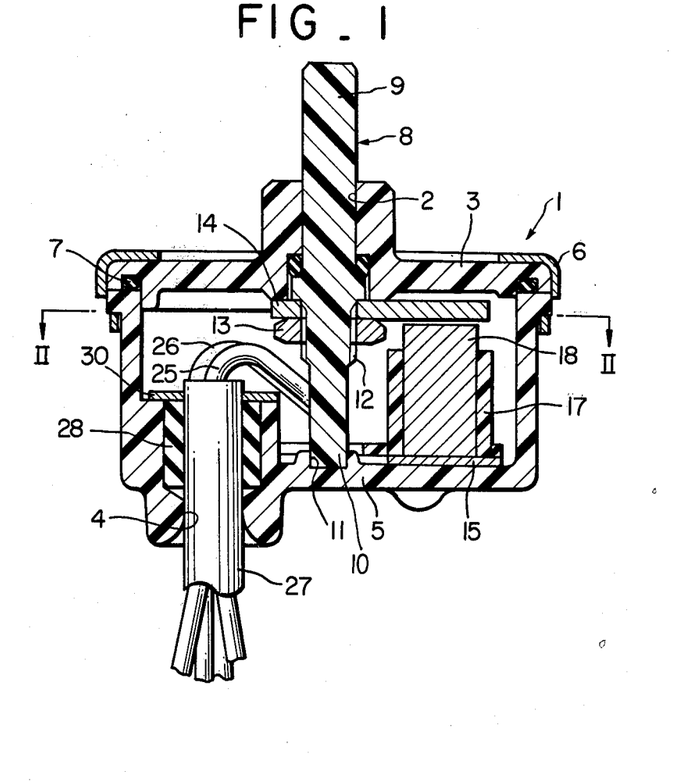
FIG. 1 is a longitudinal sectional view of a rotational angle sensor according to one preferred embodiment of the present invention.
Figure 2:
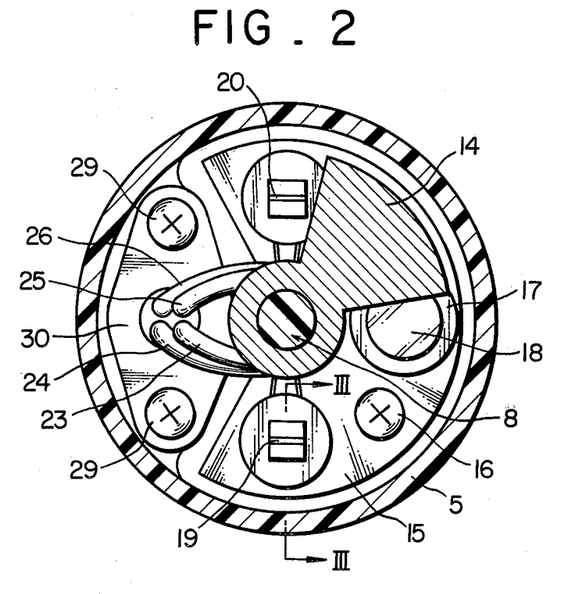
FIG. 2 is a cross-sectional view taken along the line II—II in FIG. 1.
Figure 3:
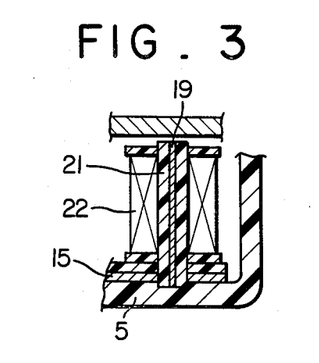
FIG. 3 is a cross-sectional view taken along the line III—III in FIG. 1.

Referring now to the drawings, wherein like reference numerals designate identical or corresponding parts throughout the several views, and more particularly to FIGS. 1 through 3 thereof, a first preferred embodiment of the present invention is illustrated. In FIG. 1, a rotational angle sensor arrangement, generally designated by 1, includes a first body 3 made of synthetic resin material having a central opening 2 and a second body 5 made of synthetic resin material having an eccentric opending 4. The bodies 3 and 5 are joined together by means of a metallic ring 6 with an intermediate O-ring seal 7 placed between the bodies. A rotary shaft member 8, made of synthetic resin material, is fitted into the central opening 2. One end 9 of the rotary shaft member 8 is coupled with a rotational drive device (not shown) and the other end 10 is rotatably journalled in a recess 11 in the bottom wall of the second body 5. The rotary shaft member 8 has a central threaded portion 12, to which a ferromagnetic material sector-shaped member 14 (see FIG. 2) is secured by means of a nut 13 which engages the threaded portion 12 for firmly placing the sector member 14 in position. Accordingly, the sector-shaped member 14 rotates with the rotations of the rotary shaft 8. The bottom wall of the second body 5 carries a substantially sector-shaped metallic base 15 (FIG. 2) attached thereto by means of a screw 16. The metallic base 15 carries a permanent magnet 18, retained by a synthetic resin material holder 17, and placed in a position substantially in parallel with the rotary shaft member 8. As clearly seen in FIG. 2, a first member 19 and a second member 20, both made of magnetically soft material, are disposed opposite each other in the radial direction of the rotary shaft 8, located diametrically between the opposite members 19 and 20. The first magnetically soft member 19 passes through a bobbin 21 carrying an electrical coil 22 thereon (FIG. 3). The bobbin 21 extends through the metallic base 15 to be held securely in a recess in the bottom of the body 5, and the magnetically soft member 19 accommodated in the bobbin is thus retained. The opposite ends of the coil 22 are coupled through respective terminals with a pair of respective lead wires 23 and 24. The second magnetically soft member is similarly surrounded by a bobbin upon which an electrical coil 31 is wound (not shown). The coil 31 is coupled to a second pair of respective lead wires 25 and 26. The lead wires 23 through 26 are accommodated in a tube 27 fitted in the eccentric opening 4 in the body 5 and extend out of the sensor casing. The tube 27 is held in position by means of a plug-type rubber holder 28, which is retained in the opening 4 by means of a metallic cover 30 attached to the body 5 by means of a metallic cover 30 attached to the body 5 by means of screws 29, 29.

Figure 4A:
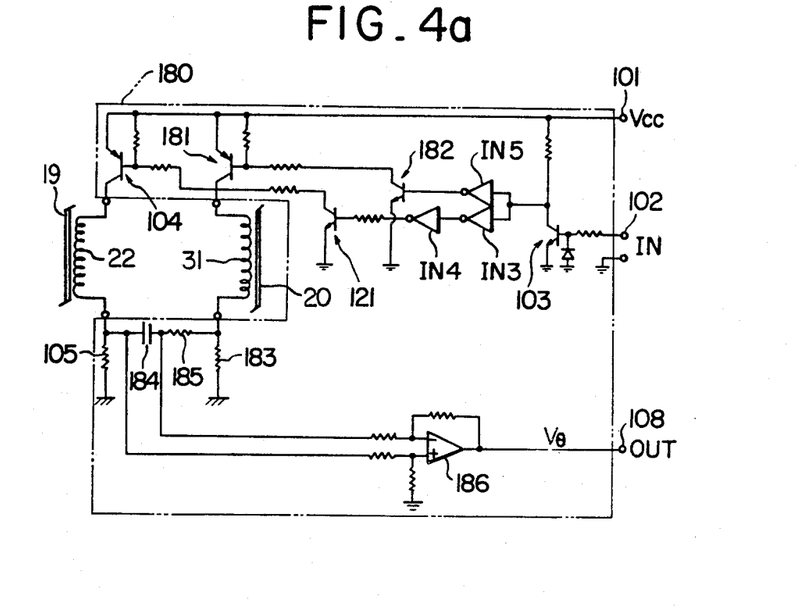
FIG. 4a is a circuit diagram illustrating the arrangement of an electrical processing circuit coupled with the rotational angle sensor shown in FIG. 1 which provides an analog voltage output having a level corresponding to the detected rotational angles.

The electrical processing circuit 180 shown in FIG. 4a provides an analog voltage output $V_\theta$ which corresponds to the angular position of the sector-shaped member 14 in the rotational angle sector 1 shown in FIGS. 1 through 3. In the circuit arrangement 180, an NPN transistor 103 turns on during a period of a positive level of an input voltage pulse (IN) coupled to terminals 102, and turns off during the period of the ground level of the input pulse. The collector voltage of the transistor 103 is applied to a pair of inverting amplifiers IN3 and IN4 which provide an amplified and shaped waveform output, which is applied to the base of an NPN transistor 121. Thus, during the period of the positive level of the applied input voltage pulse (IN), the transistor 103 turns on, thereby turning transistor 121 off and thereby turning PNP transistor 104 off. The applied ground level input voltage pulse (IN) turns off the transistor 103 thereby turning on transistor 121 and transistor 104. In other words, a voltage pulse is applied to the coil 22, and as a result a voltage pulse, which begins to rise at a time delay td, after the falling edge of the input voltage pulse (IN), appears across a resistor 105; the voltage pulse corresponding to the distance $X_1 = f(\theta)$ of the sector-shaped member 14 from the magnetically soft member 19 or 20. A constant voltage is applied to the other coil 31 through a PNP transistor 181. This transistor 181 turns on as a result of transistor 103 being turned on during the period of the positive level of the input voltage (IN) and turning on NPN transistor 182 when the output of the inverting amplifier IN5 is at a positive level. Transistor 181 turns off during the period of the ground level of the input voltage pulse (IN). Consequently, a constant voltage is applied to the second coil 31 during the time period when no voltage is applied to the first coil 22. Reversely, the second coil 31 has no supply of the constant voltage during the time period when a voltage is applied to the first coil 22. As noted above, the supply of the constant voltage alternates between the first and second coils, depending on the state of the applied input voltage pulse (IN). The second coil 31 is coupled with a resistor 183, across which a voltage appears which begins to rise at a time delay $td_2$ after the rising edge of the input voltage pulse (IN) and corresponds to the distance $x_2 = f(\theta)$ of the sector-shaped member 14 from the magnetically soft member 19 or 20. A voltage $Vx_1$ appearing across the resistor 105 is applied to one terminal plate of a capacitor 184, and a voltage $Vx_2$ appearing across the resistor 183 is applied to the other terminal plate of the capacitor 184 through a resistor 185. The distances of the sector-shaped member 14 away from the first and second magnetically soft members 19 and 20 are represented by $x_1$ and $x_2$, respectively, in which $x_1 + x_2 = K$(constant), with $Vx_1 \alpha x_1$ and $Vx_2 \alpha x_2$. As a result, the potential difference between the two terminal plates of the capacitor 184 corresponds to $x_1 - x_2$. The capacitor 184 and resistor 185 form an integrator circuit. Therefore the voltage stored in the capacitor 184 corresponds to the magnitude of $x_1 - x_2$. Hence, since $x_2 = K - x_1$ and $x_1 - x_2 = 2x_1 + K$, the voltage stored in the capacitor 184 corresponds to the value of $2x_1$. Thus, an analog voltage is obtained which is equal to two times the angular displacement $x_1$ of the sector-shaped member 14 with reference to the first magnetically soft member 19 which is assumed as a reference point. The opposite terminals of the capacitor 184 are coupled with the respective inputs of an operational amplifier 186 which acts as a differential amplifier. Therefore, an analog output voltage $V_\theta$ of the amplifier 186 corresponds to the value of $2x_1$.

Figure 4B:
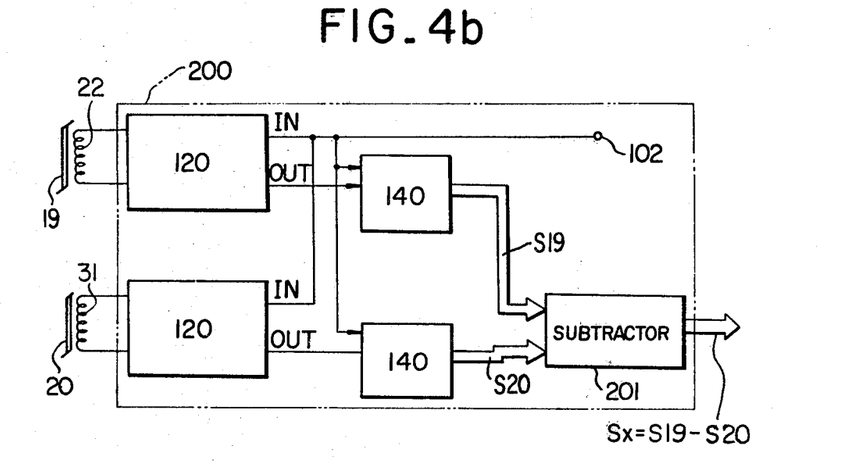
FIG. 4b is a circuit diagram illustrating the arrangement of another electrical processing circuit coupled with the rotational angle sensor shown in FIG. 1 which provides a digital code output corresponding to the detected rotational angles.
Figure 11A:
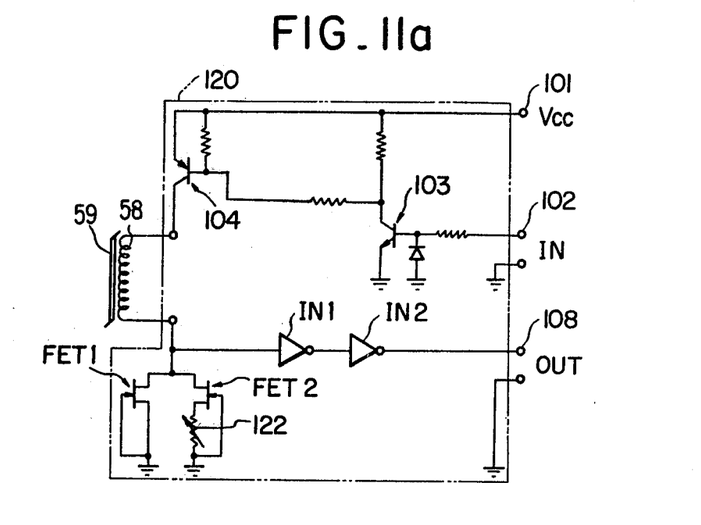
FIG. 11a is a circuit diagram illustrating the arrangement of another electrical circuit coupled with the rotational angle sensor shown in FIG. 7a which provides an output of time difference pulses which correspond to the detected rotational angles.
Figure 12:
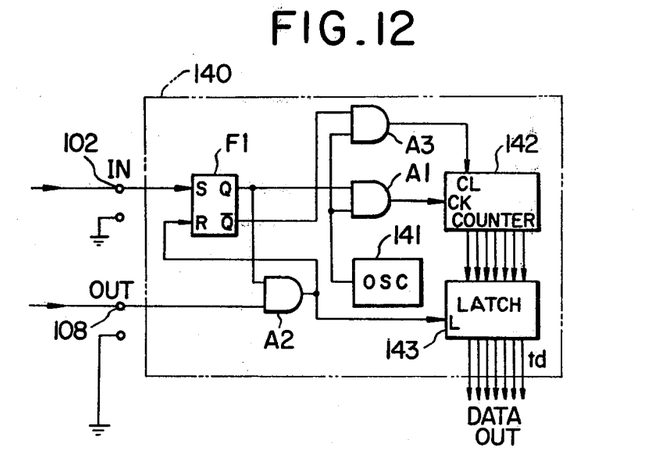
FIG. 12 is a block diagram illustrating a counter circuit which converts a time difference td between input and output pulses of the electrical processing circuit 120 shown in FIG. 11a into a corresponding digital code.

In the electrical processing circuit shown in FIG. 4b, two circuits 120 provide respective pulses which lag by time intervals $td_1$ and $td_2$, respectively, with reference to the rising edge of an input pulse applied to terminal 102, and which are fed to respective counter circuits 140. In response to the applied input pulses, the counter circuits 140 provide code signals S19 and S20, respectively, which represent the values of $td_1$ and $td_2$, respectively; the code signals being further fed into a subtractor circuit 201. The subtractor circuit 201 uses the code signals S19 and S20 to perform a subtract operation on $td_1 - td_2$, providing a digital code output $S_x = S19 - S20$ which represents $td_1 - td_2$ or $2x_1$. The circuits 120 and 140 are illustrated in FIGS. 11a and 12 and are discussed in detail below.

Figure 4C:
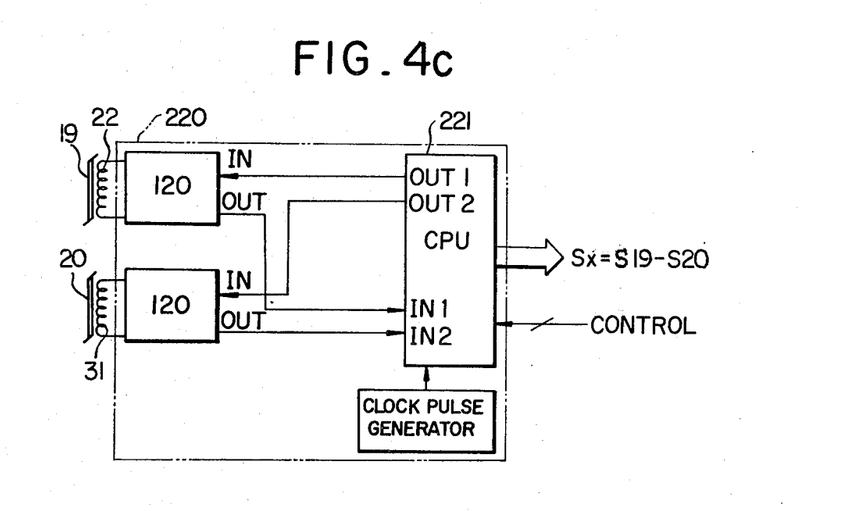
FIG. 4c is a circuit diagram illustrating the arrangement of an electronic logic processor circuit coupled with the rotational angle sensor which provides a digital code output corresonding to the detected rotational angles.

In accordance with the electronic logic processor unit 220 shown in FIG. 4c, a single chip microcomputer 221 delivers one initial pulse to the circuit 120 coupled with the electrical coil 22, and starts a time count with the rising edge of that pulse, creating $td_1$ count data S19 and storing it. Then, the microcomputer delivers another initial pulse to the electrical coil 31 and starts a time count with the rising edge of that pulse, creating $td_2$ count data S20. Thereafter, the microcomputer performs a subtract operation $td_1 - td_2$ and provides a resulted code signal $S_x = S19 - S20$, continuing this operation as long as measurement command signals are issued. Circuit 120 will be discussed below with reference to FIG. 11a.

Figure 5A:
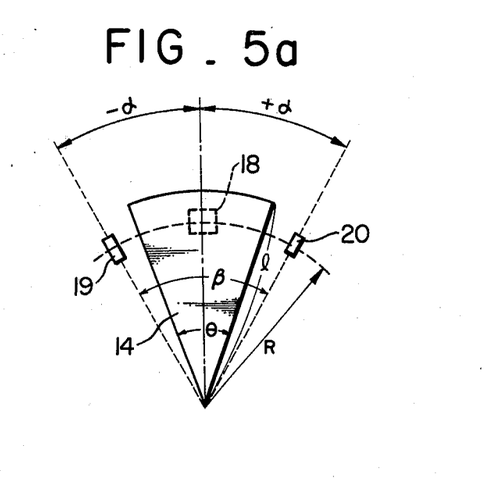
FIG. 5a is a plan view illustrating the relative positions that the magnetically soft members, the permanent magnet, and the ferromagnetic member assume with respect to each other for the rotational angle sensor shown in FIG. 1.
Figure 5B:
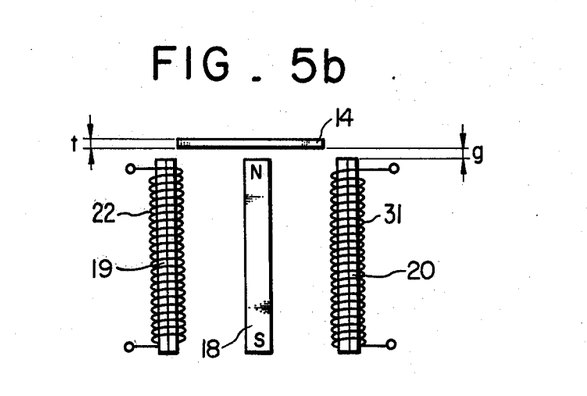
FIG. 5b is a front view of the arrangement shown in FIG. 1.

The present inventor has used the following arrangement shown in FIGS. 5a and 5b and the following assumptions to determine the values of the output voltage V as a function of the angular displacement $\alpha$ of a sector-shaped soft iron plate 14. The measurements have been taken by arranging magnetically soft members 19 and 20 in parallel with each other and arranging a permanent magnet 18 between the magnetically soft members 19 and 20 such that the permanent magnet 18 is in parallel with the magnetically soft members 19 and 20. The soft iron plate 14 rotates above the magnetically soft members 19, 20 and permanent magnet 18. It is assumed that the center of the soft iron plate 14, being placed immediately above the permanent magnet 18 or being placed in its middle position between the two magnetically soft members 19 and 20, corresponds to a rotational angle α of zero (0)

Table 1 presents the relationships between the parameters such as shape, dimension, and types of materials of the magnetically soft members, and the resultant experimental data.

TABLE 1

| Case No. | Magnetically Soft Member 19, 20 | | | | | | | Coil |
|---|---|---|---|---|---|---|---|---|
| | Material, atomic weight Percent | Length mm | Width mm | Thickness mm | Number of sheets | R mm | $\beta_o$ | Number of turns |
| 1 | $Fe_{40}Ni_{38}Mo_4B_6$ Amorphous | 30 | 1.8 | 1.8 | 5 | 40 | 60 | 1000 |
| 2 | $Fe_{40}Ni_{38}Mo_4B_6$ Amorphous | 30 | 1.8 | 1.8 | 5 | 40 | 60 | 1000 |

Figure 6A:
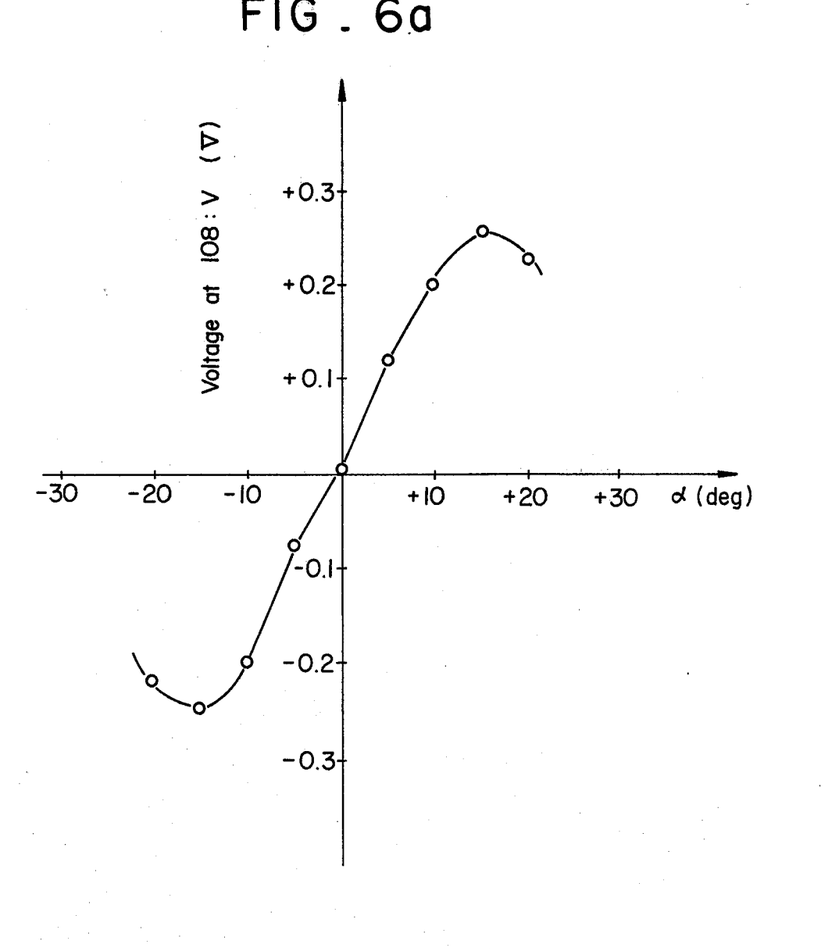
Figure 6B:
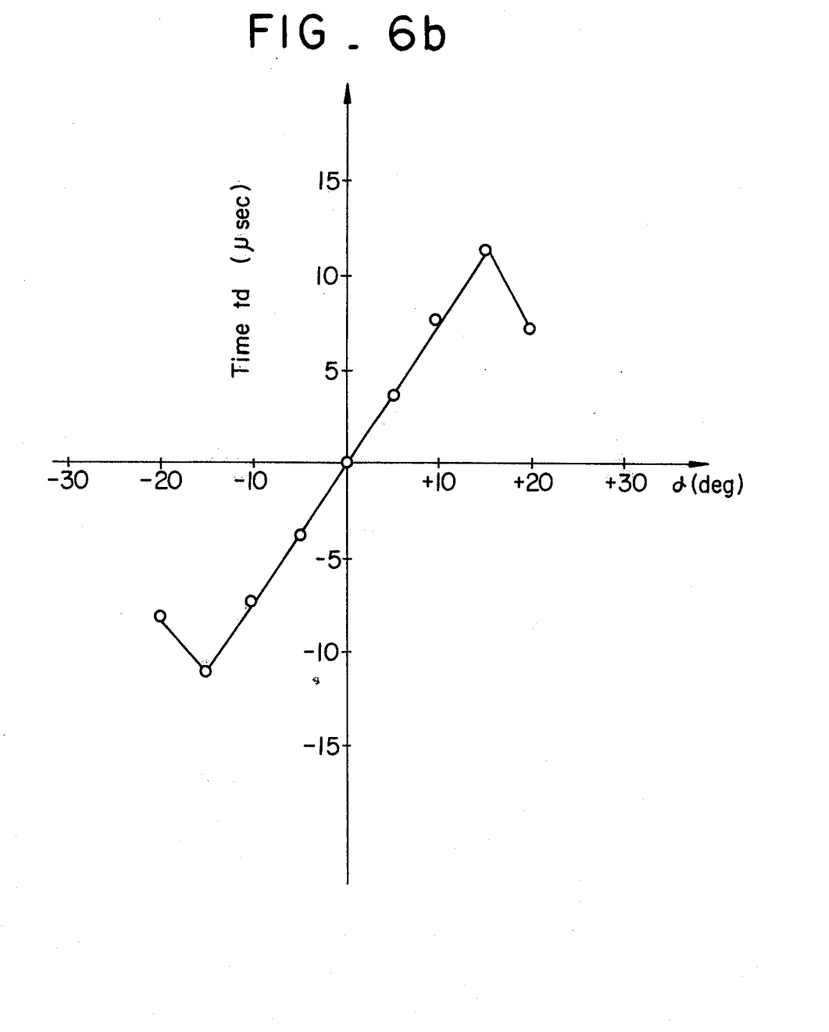
FIG. 6b is a graphical representation of data obtained by measuring a time difference td between input and output pulse waveforms as a function of the angular displacement of the ferromagnetic member obtained by using the arrangement shown in FIGS. 5a and 5b coupled to the electrical processing circuit shown in FIG. 4b.

| Case No. | Permanent magnet 18 | | | Soft Iron Plate 14 | | | | Measuring means and frequency of input pulse | Voltage polarity | Data |
|---|---|---|---|---|---|---|---|---|---|---|
| | Length mm | Width mm | Thick mm | l mm | $\theta_o$ | t mm | g mm | | | |
| 1 | 30 | 5 | 5 | 45 | 40 | 2 | 2 | Circuit 180 5 KHz | N—N | FIG. 6a |
| 2 | 30 | 5 | 5 | 45 | 40 | 2 | 2 | Circuit 200 5 KHz | N—N | FIG. 6b |

As clearly seen in FIG. 6a, the α—V characteristic has a good linearity when the rotation angle α of the soft iron plate 14 is in the range of $-15° \leq \alpha \leq +15°$. Similarly, as clearly noted in FIG. 6b, the α—td (time difference) characteristic gas a good linearity when the rotational angle α is in the range of $-15° \leq \alpha \leq +15°$. This demonstrates that good linearity can be obtained by causing the center of the soft iron plate 14 to rotate angularly within the range of ±15° of the position shown in the drawing. It is also noted that the angular displacement of the soft iron plate 14 within the above range helps the permanent magnet supply an increased flux to act on the magnetically soft member, whereas the angular displacement of the plate 14 outside the above range decreases the flux. Since it is clear from the above that the α—V characteristic is effected not only by the angular distance β between the magnetically soft members 19 and 20, but also by the shapes of the permanent magnet 18 and its supplied magnetic field strength, it is relatively easy to select any α—V characteristic as desired.

Figure 7:
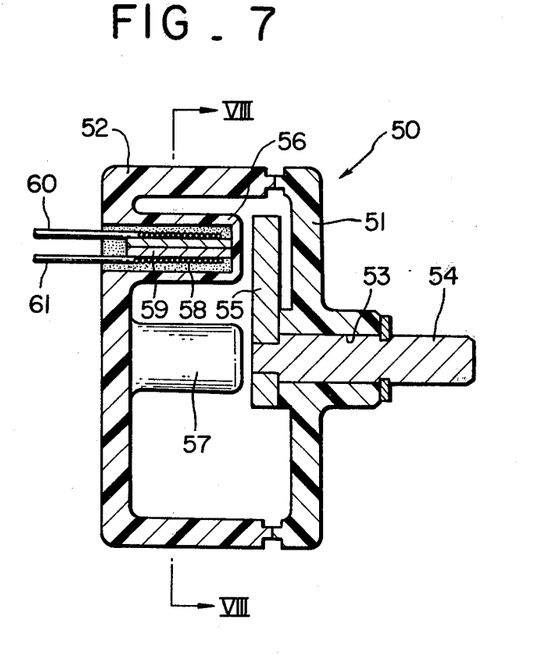
FIG. 7 is a longitudinal sectional view of the rotational angle sensor according to another preferred embodiment of the present invention.
Figure 8:
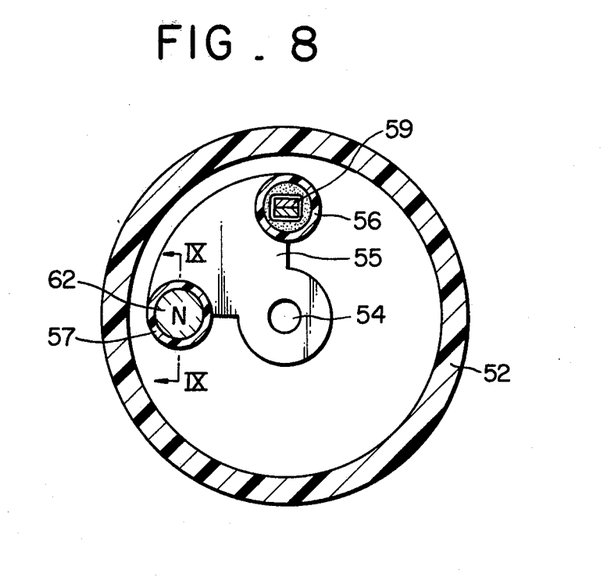
FIG. 8 is a cross-sectional view taken along the line VIII—VIII in FIG. 7.
Figure 9:
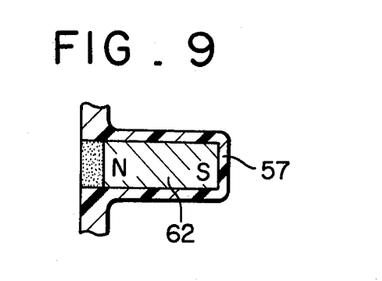
FIG. 9 is a cross-sectional view taken along the line IX—IX in FIG. 8.

FIGS. 7 to 9 illustrate another preferred embodiment of the present invention, which particularly differs from the earlier embodiment in that in the embodiment of FIGS. 7 to 9 one magnetically soft member is provided instead of two. In this embodiment, the rotational angle sensor arrangement generally designated by 50 includes a first body 51 and a second body 52, both made of synthetic resin material, which are combined by a means such as ultrasonic wave welding. The first body 51 has a central opening 53 in which a rotary shaft 54 is accommodated. The rotary shaft 54 has one end thereof secured to a sector-shaped member 55 made of ferromagnetic material. The second body 52 has a first projection 56 and a second projection 57, spaced apart from each other, on the circumference of the second body 52. The first projection accommodates therein a magnetically soft member 59, carrying an electrical coil 58 thereon. The opposite ends of the coil 58 are connected to leads 60 and 61, respectively, extending outside the body of the sensor 50. The second projection 57 accommodates a firmly mounted permanent magnetic 62 therein. As such, any angular displacement of the sector-shaped member 55 causes corresponding changes in the magnetic flux provided by the permanent magnet 62 which acts on the magnetically soft member 59. The changes are then detected by an electrical processing circuit or an electronic logic processor unit which will be described in detail below.

Figure 10A:
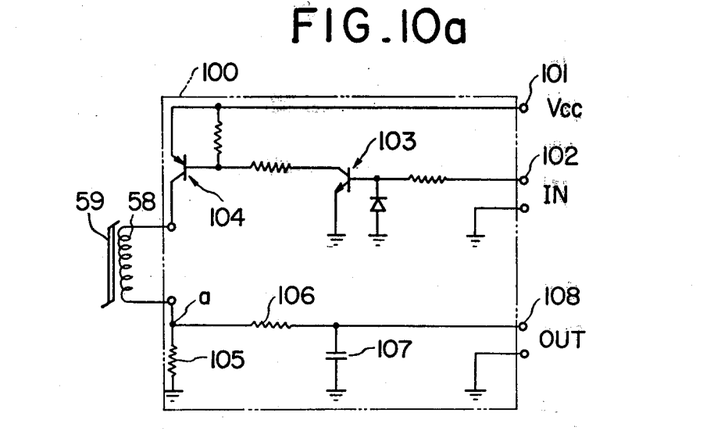
FIG. 10a is a circuit diagram illustrating the arrangement of an electrical processing circuit coupled with the rotational angle sensor shown in FIG. 7 which provides an analog voltage output having a level which corresponds to the detected rotational angles.

FIG. 10a is a schematic diagram illustrating the arrangement of an electrical processing circuit 100 according to a first embodiment. The circuit arrangement 100 includes a terminal 101 coupled with a constant power supply source (not shown) to which a constant level d.c. voltage (+5V, for example) from the power source is applied. An input terminal 102 is provided. As such, applying a voltage pulse of 5 to 25 KHz to the input terminal 102 causes an NPN transistor 103 to conduct during the positive level of the voltage pulse while causing the NPN transistor 103 to turn off during the ground level of the pulse. A PNP transistor 104 coupled to transistor 103, remains on during the time period that NPN transistor 103 is on, and remains off during the time period that NPN transistor 103 is off. As noted from the above, a constant supply voltage (Vcc), which is applied to the terminal 101, is applied to a coil 58, during the positive level of the voltage pulses applied to the input terminal 102, and no supply voltage is applied to the coil during the ground level of the input voltage pulses. A voltage proportional to a current flow through the coil 58 is developed across a resistor 105, and is applied to an integrator circuit consisting of a resistor 106 and a capacitor 107. The integrator circuit provides an integrated voltage output, which appears at an output terminal 108.

Figure 10B:
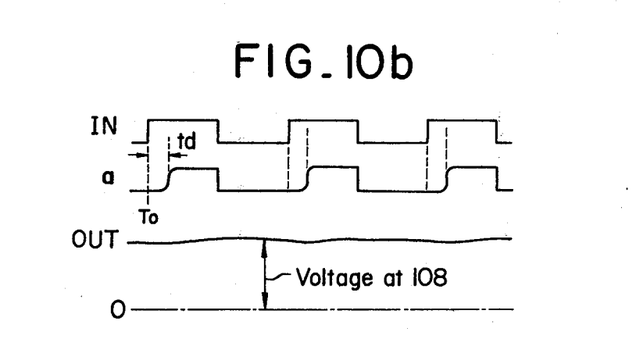

FIG. 10b shows the waveforms of the input and output voltages of the circuit shown in FIG. 10a. A time interval td from the instant at which the input voltage (IN) rises at the beginning of the positive level to the instant at which the voltage across the resistor 105 rises to over a given level, and the integrated voltage Vx appearing at a point across the resistor 105, correspond to the angular displacement of the sector-shaped member 55.

FIG. 11a is a schematic diagram illustrating the arrangement of an electrical processing circuit 120 according to another embodiment. In this embodiment, NPN transistor 103 is turned off during the ground level of the input voltage (IN), causing PNP transistor 104 to turn off. Therefore, no voltage is applied to the coil 58. On the other hand, the transistor 103 turns on during the positive level of the input voltage (IN), causing the PNP transistor 104 to turn on. A coil current flows into a pair of junction N-channel field effect transistors FET1 and FET2 which provide a constant level current. The level of a current flow through FET2 is determined by a variable resistor 122. A voltage across the coil terminals coupled with FET1 and FET2 is connected to a pair of cascade connected inverting amplifiers IN1 and IN2 which provide an amplified and shaped output voltage waveform.

Figure 11B:
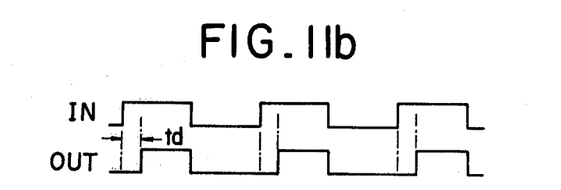

FIG. 11b shows the input and output voltage waveforms of the circuit shown in FIG. 11a. As clearly understood from the illustrated waveforms, output (OUT) of the circuit 120 is a voltage pulse which rises a delayed time interval td with respect to the input pulse (IN). The time interval td corresponds to the angular position assumed by the permanent magnet 14. The time interval or delay td is processed by a counter circuit 140 shown in FIG. 12 which provides a digital code signal representing the input time interval information. In the counter circuit 140, the rising edge of the input voltage pulse (IN) sets a flipflop circuit F1 whose Q output assumes a high level "1", enabling an AND gate A1 to be triggered on thus allowing a pulse provided by a clock pulse generator 141 to be applied to a count pulse input CK of a counter 142. An output pulse (OUT) and the Q output of the flipflop F1 are applied to an AND gate A2. The AND gate A2 is triggered to a high level state "1" at the rising edge of the output pulse (OUT). The flipflop F1 is reset at the rising edge of the output of gate A2, causing the Q output to assume a low level state "0". Thus, the AND gate A1 is disabled, and a clock pulse is no longer fed to the counter 142. When the output of the AND gate A2 changes to a "1" state, a count code output of the counter 142 is stored in a latch circuit 143. Resetting flipflop F1 and storing the count code output in the latch circuit 143 causes the AND gate A3 to provide a clock pulse output which clears the counter 142. The code output of the latch circuit 143 represents the number of occurrences of the clock pulse during the time interval td, and accordingly represents the time interval td.

Figure 13:
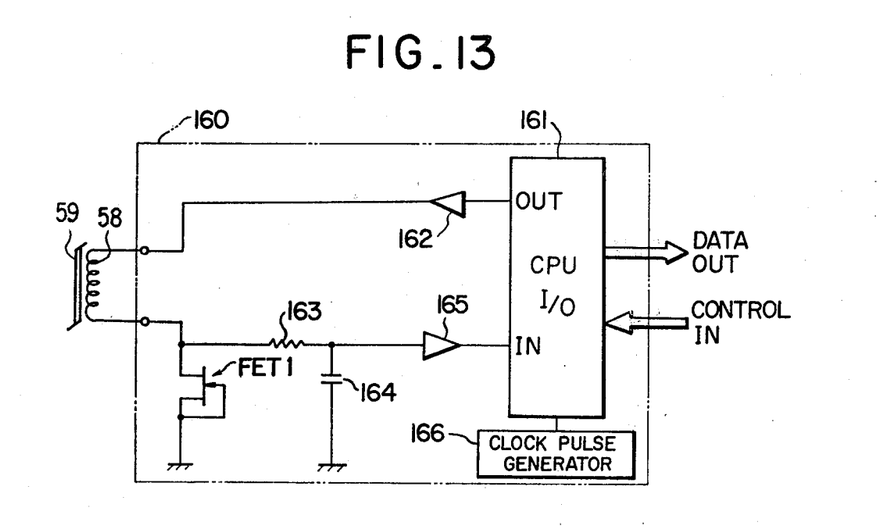
FIG. 13 is a block diagram illustrating the arrangement of an electronic logic processor unit 160 coupled with the rotation angle sensor shown in FIG. 7.

An electronic logic processor unit 160 illustrated in FIG. 13 includes a single chip microcomputer 161, a large scale integrated (LSI) semiconductor device, an amplifier 162, a junction N-channel field effect transistor FET1 which acts a constant current source, a resistor 163, a capacitor 164, an amplifier 165 and a clock pulse generator 166. The resistor 163 and capacitor 164 form a filter circuit which rejects voltage frequencies above the input and output pulse frequencies. The microcomputer 161 is operated based on the clock pulses and provides constant frequency pulses in the frequency range between 5 KHz and 30 KHz, which are also fed to the amplifier circuit 162. The microcomputer 161 also monitors a voltage (the output voltage of the amplifier 165) appearing at a junction between the N-channel FET1 and one end of the coil 58, and counts the number of clock pulses appearing during a time interval td from the rising edge of the output voltage pulse of the amplifier 165, and provides a count code output (DATA OUT) which represents the time interval data td.

As noted above, the rotational angle sensor 50 shown in FIG. 7 is connected to the various forms of the electrical processing circuits and the electronical logic processor circuit arrangement so as to provide an electrical signal which represents an angular position to be assumed by the sector-shaped member 55 in the sensor arrangement 50.

As it will be readily understood from the foregoing description of the several preferred embodiments and the references to the experimental data obtained in carrying out those embodiments, the rotational angle sensor according to the present invention has no mechanical sliding contact parts, and is responsive to the angular displacement of the movable body. The rotational angle sensor can convert the angular displacement of the movable body to a time difference td between the input pulse applied to the electrical coil and the current pulse to energize the winding, and can electrically process the time difference td to provide an angular displacement detect signal in the form of an analog voltage or time count data. Thus, the sensor construction is particularly advantageous due to its high mechanical vibration and its wear resistance. The fact that no mechanical linkage is required to connect between the movable body and the associated transducer, provides a stable rotational angle detection which is not adversely affected by any mechanical rattling that might otherwise by caused. The advantages that should be particularly noted are the simple arrangement of the electric processing circuits to be coupled with the rotational angle sensor, and more particularly the use of the large scale integrated (LSI) semiconductor device such as the single chip microcomputer which provides a rotational angle detect pulse and provides a simple means for converting a time difference between that pulse and a coil energizing current detect pulse to a suitable digital code form.

Although the present invention has been described with reference to the several preferred embodiments thereof, obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotational angle sensor device, comprising:
   a casing;
   rotatable shaft means rotatably supported by said casing, the angular position of said rotatable shaft means being responsive to an angular displacement of an external object;
   permanent magnet means firmly mounted inside said casing for providing a magnetic field;
   at least one core means disposed adjacent to said permanent magnet means, said at least one core means being firmly mounted inside said casing, said at least one core means including a thin sheet of magnetically soft material;
   electrical coil means including at least one coil wound about said at least one core means;
   a ferromagnetic member secured to said rotatable shaft means and movable therewith, said ferromagnetic member being capable of angular movement in a spaced relationship with respect to said at least one core means and to said permanent magnetic means;
   means for applying an electrical signal to a first terminal of said coil to saturate said core means magnetically; and
   means for producing an angular position output signal indicative of the rotation of said rotatable shaft means based on the amount of time between application of said electrical signal and saturation of said core means.

2. A rotational angle sensor device as recited in claim 1 wherein:
said feromagnetic member has an essentially sector-shaped cross-section.

3. A rotational angle sensor device as recited in claim 1, wherein:
said magnetically soft material is an amorphous magnetically soft material.

4. A rotational angle sensor device as recited in claim 1, wherein:
said at least one core means includes two core members disposed in an opposed relationship to each other, each of said two core members including magnetically soft material; and
said permanent magnetic means is disposed at a location midway between said two core members.

5. A rotational angle sensor device as recited in claim 4, wherein:
said two core members are disposed along a circumference of a circle concentric with an axis of rotation of said rotatable shaft means, said two core members being disposed diametrically opposite to each other, each of said two core members including an axis passing through its poles, each axis of said two core members being parallel to said axis of rotation of said rotatable shaft means.

6. A rotational angle sensor device as recited in claim 1, wherein:
said at least one core means includes one core member, said core member including magnetically soft material, said core member being spaced apart from said permanent magnetic means, said core member and said permanent magnet means being disposed along a circumference of a circle concentric with an axis of rotation of said rotatable shaft means.

7. A rotational angle sensor device as recited in claim 1, wherein:
said permanent magnet means and said at least one core means are firmly coupled to a common metallic base.

8. A rotational angle sensor device as recited in claim 1, wherein said rotatable shaft means comprises:
a first end portion rotatably supported by said casing; and
a central threaded portion engaging said ferromagnet member.

9. A rotational angle sensor device as recited in claim 1, wherein said casing comprises:
a plurality of projecting members extending from an interior surface thereof, each of said plurality of projecting members including a cavity therein, each cavity in said plurality of projecting members accommodating one of said permanent magnet means or said at least one core means.

10. A rotational angle sensor device as recited in claim 1, wherein:
said permanent magnet means includes a first axis passing through its poles;
said at least one core means includes a second axis passing therethrough, said second axis being substantially parallel to said first axis; and
said ferromagnetic member being movable in directions defined by a plane, said plane being perpendicular to said first and second axes.

11. A rotational angle sensor device according to claim 1, wherein said detecting means comprises:
constant current means coupled to a second terminal of said coil for producing a constant current through said coil upon application of said electrical signal to said first terminal of said coil.

12. A rotational angle sensor according to claim 11, wherein said constant current means comprises:
at least one field effect transistor connected to said second terminal of said coil.

* * * * *

UNITED STATES PATENT AND TRADEMARK OFFICE
CERTIFICATE OF CORRECTION

PATENT NO. : 4,398,419

DATED : AUGUST 16, 1983

INVENTOR(S) : SHINICHIRO IWASAKI

It is certified that error appears in the above-identified patent and that said Letters Patent is hereby corrected as shown below:

On the title page

IN THE ABSTRACT: line 3, delete "magnetic" and substitute --magnet--.

Col. 1, line 51, delete "or" and substitute --of--.
Col. 3, line 50, delete "corresonding" and substitute --corresponding--.
Col. 3, line 52, delete "plan" and substitute --plane--.
Col. 3, line 59, delete "graphic" and substitute --graphical--.
Col. 4, line 46, delete "opending" and substitute --opening--.

Col. 5, line 50, after "input voltage" insert --pulse--.
Col. 7, line 4, delete "dimension" and substitute --dimensions--.
Col. 7, line 28, delete "gas" and substitute --has--.
Col. 7, line 65, delete "magnetic" and substitute --magnet--.
Col. 10, line 19, delete "by" and substitute --be--.

Signed and Sealed this

Thirty-first Day of July 1984

[SEAL]

Attest:

GERALD J. MOSSINGHOFF

Attesting Officer

Commissioner of Patents and Trademarks